United States Patent
Hellinger et al.

(10) Patent No.: US 11,563,360 B2
(45) Date of Patent: Jan. 24, 2023

(54) HOUSING FOR AN ELECTRIC MACHINE WITH A COOLING DEVICE

(71) Applicant: MELECS EWS GmbH, Siegendorf (AT)

(72) Inventors: Leopold Hellinger, Ziersdorf (AT); Gerhard Neumann, St. Margarethen (AT); Manfred Lex, Oberpullndorf (AT)

(73) Assignee: MELECS EWS GMBH, Siegendorf (AT)

( * ) Notice: Subject to any disclaimer, the term of this patent is extended or adjusted under 35 U.S.C. 154(b) by 209 days.

(21) Appl. No.: 16/471,439

(22) PCT Filed: Dec. 7, 2017

(86) PCT No.: PCT/EP2017/081779
§ 371 (c)(1),
(2) Date: Jun. 19, 2019

(87) PCT Pub. No.: WO2018/114349
PCT Pub. Date: Jun. 28, 2018

(65) Prior Publication Data
US 2021/0135545 A1  May 6, 2021

(30) Foreign Application Priority Data
Dec. 20, 2016  (AT) .............. A 51160/2016

(51) Int. Cl.
*H02K 9/22*  (2006.01)
*H02K 5/173*  (2006.01)
(Continued)

(52) U.S. Cl.
CPC ......... *H02K 11/215* (2016.01); *H02K 5/1732* (2013.01); *H02K 5/24* (2013.01); *H02K 9/223* (2021.01)

(58) Field of Classification Search
CPC ...... H02K 9/22; H02K 5/1732; H02K 11/215; H02K 5/24
(Continued)

(56) References Cited

U.S. PATENT DOCUMENTS 4,415,025 A * 11/1983 Horvath ................ H01L 23/433
257/E23.09
5,920,120 A *  7/1999 Webb .................. H01L 23/4093
257/737

(Continued)

FOREIGN PATENT DOCUMENTS

EP  0769840  4/1997
EP  2429273  3/2012
(Continued)

OTHER PUBLICATIONS

Fukazawa et al (JP 11356006 A), English translation, printed on Jun. 24, 2021.*
(Continued)

Primary Examiner — John K Kim
(74) Attorney, Agent, or Firm — Cozen O'Connor

(57) ABSTRACT

A housing for an electric machine includes a cooling device arranged on the periphery of a support plate, the cooling device contacts a heat-conducting ring connected to the housing, and the support plate as well as components arranged thereon have vibration damping and an electric insulation to provide advantageous structural conditions such that an advantageous cooling effect is achieved, and regions within the cooling device can be provided for fitting elements of the support plate.

12 Claims, 2 Drawing Sheets

(51) Int. Cl.
  *H02K 11/215* (2016.01)
  *H02K 5/24* (2006.01)
(58) Field of Classification Search
  USPC .......................................................... 310/52
  See application file for complete search history.

(56) References Cited

U.S. PATENT DOCUMENTS

| | | | | |
|---|---|---|---|---|
| 6,081,056 | A * | 6/2000 | Takagi | H02K 5/08 |
| | | | | 310/216.137 |
| 6,175,171 | B1 * | 1/2001 | Rupp | H02K 9/06 |
| | | | | 310/68 R |
| 6,566,879 | B1 * | 5/2003 | Vanek | G01R 33/3852 |
| | | | | 324/318 |
| 6,891,730 | B2 * | 5/2005 | Farassat | H01L 24/72 |
| | | | | 361/728 |
| 7,518,235 | B2 * | 4/2009 | Coico | H01L 23/4006 |
| | | | | 257/E23.084 |
| 7,746,653 | B2 * | 6/2010 | Negrut | H01L 23/4006 |
| | | | | 165/185 |
| 7,995,344 | B2 * | 8/2011 | Dando, III | H01L 23/433 |
| | | | | 257/713 |
| 8,120,171 | B2 * | 2/2012 | Koike | H01L 24/72 |
| | | | | 174/16.3 |
| 8,506,264 | B2 | 8/2013 | Horng et al. | |
| 9,948,154 | B2 * | 4/2018 | Bohm | H02K 11/33 |
| 2006/0082975 | A1 | 4/2006 | Caines et al. | |
| 2006/0250756 | A1 | 11/2006 | Sugimoto et al. | |
| 2014/0285987 | A1 * | 9/2014 | Nagashima | B60T 8/368 |
| | | | | 361/759 |
| 2016/0036299 | A1 * | 2/2016 | Hayashi | H02K 9/227 |
| | | | | 310/64 |
| 2016/0099623 | A1 * | 4/2016 | Böhm | H02K 9/19 |
| | | | | 310/43 |
| 2021/0135545 | A1 * | 5/2021 | Hellinger | H02K 11/215 |

FOREIGN PATENT DOCUMENTS

| | | |
|---|---|---|
| EP | 3007330 | 4/2016 |
| JP | H11356006 | 12/1999 |
| JP | 2015106970 | 6/2015 |

OTHER PUBLICATIONS

International Search Report based on PCT/EP2017/081779 dated Apr. 5, 2018.

* cited by examiner

HOUSING FOR AN ELECTRIC MACHINE WITH A COOLING DEVICE

CROSS-REFERENCE TO RELATED APPLICATIONS

This is a U.S. national stage of application No. PCT/EP2017/081779 filed Dec. 7, 2017. Priority is claimed on AT Application No. 51160/2016 filed Dec. 20, 2016, the content of which is incorporated herein by reference in its entirety.

BACKGROUND OF THE INVENTION

1. Field of the Invention

The invention relates to a housing for an electric machine with a cooling device.

2. Description of the Related Art

The need often arises, in particular in vehicle electronics, to integrate devices with control electronics into an engine, into a transmission or into a pump etc., in order to make the best possible use of limited installation compartments and to keep conduction paths short. Heat output by support plates populated, for example, with transistors needs to be dissipated as effectively as possible via cooling devices.

EP 2 429 273 A2 is known from the prior art and describes a cooling device for an electric device. An electronic circuit is arranged on a support plate. Cylindrical press-on domes mechanically and thermally contact elements producing power loss. The press-on domes are provided between housing inner walls and the elements producing power loss, and press the support plate against in inner side of a housing lid taking the form of a heat sink. Heat that arises is dissipated via this housing lid from the elements producing power loss to a surrounding environment.

Press-on and cooling devices arranged on the periphery of the support plate are not disclosed in EP 2 429 273 A2.

Furthermore, US 2006/0082975 A1 discloses a housing for an electronic control unit that has a support plate. Transistors are arranged on two sides of the support plate in each case along a straight line, i.e., two rows of transistors are arranged in total. Each of the two rows of transistors is pressed against the support plate via its own spring plate arranged between the housing and the respective row of transistors. A cooling device is arranged on the support plate directly below each of the two rows of transistors. In the region of these cooling devices, the support plate rests on heat sinks.

SUMMARY OF THE INVENTION

The object of the present invention is to provide a housing which is further developed over the prior art.

This and other objects and advantages are achieved in accordance with the invention by a housing, in which a cooling device is arranged on the periphery of a support plate, in which the cooling device contacts a heat-conducting ring connected with the housing, and in which the support plate and components arranged thereon are vibration damped and electrically insulated.

The peripheral arrangement of the cooling device on the support plate brings about a large area or a large volume via which heat may be dissipated from the support plate to a surrounding environment. Furthermore, a particularly compact and space-saving arrangement is achieved thereby. This is helpful for applications in the automotive sector and, in particular, for use of the cooling device in the housing of an electric machine. The cooling device may, for example, be formed as a circular ring. In this way, the advantage is achieved that the space on the support plate available within the cooling device may be used for populating elements. For example, a rotation sensor may be arranged within the cooling device, which sensor interacts with a magnet arranged on the end face of a shaft rotating below the support plate.

The contact between the cooling device and a heat-conducting ring connected with the housing brings about heat dissipation from the support plate along the heat-conducting ring via the housing to a surrounding environment. The heat-conducting ring may, for example, be arranged on an inner circumferential surface of the housing which, for example, has a cylindrical construction, whereby heat dissipation is achieved via the circumferential surface of the housing. Components of the electrical machine, such as sensors, shafts, or insulating bodies, may be arranged in the region within the heat-conducting ring. The peripheral construction of the cooling device and of the heat-conducting ring results in a compact, space-saving arrangement simultaneously combined with effective heat dissipation from the housing.

Furthermore, the vibration damping protects the support plate and the components arranged thereon from mechanical loads.

The cooling device, for example, has electroplated holes and metallized surfaces, which are formed such that heat is transported from one side of the support plate to an opposing side of the support plate, where the stated sides are electrically insulated from one another. Electromagnetic compatibility (EMC) is achieved by way of the electrical insulation and a defined electrical connection between the support plate and the heat-conducting ring.

It is favorable for the support plate to be mounted on the heat-conducting ring. This measure makes it possible to dispense with separate structure for mounting the support plate in the housing. The heat-conducting ring, on the one hand, brings about heat dissipation from the housing and, on the other hand, functions as a bearing seat for the support plate. This results in a space-saving arrangement with regard to the structural space available in the housing.

A favorable solution is achieved if at least one electrically insulating and vibration-damping elastic element is connected force-lockingly with the support plate. The multi-functional nature of the elastic element results in a reduction in the number of components needed for electrical insulation and for vibration damping and enables a particularly space-saving arrangement to be achieved.

An advantageous embodiment is obtained if a press-on ring arranged on the housing lid presses the support plate onto the heat-conducting ring.

It is furthermore favorable for the press-on ring to be configured simultaneously as a spring and as a seal. This measure results in space-saving utilization of the structural space available in the housing, because it is possible to dispense with separate sealing device between the housing lid and the support plate.

A favorable embodiment is achieved if an insulating body is provided between the support plate and the electric machine and if the insulating body is formed as a bearing seat for a shaft.

Configuring the insulation body as a bearing seat achieves a space-saving arrangement. Separate components for accommodating a bearing of the shaft may be dispensed with.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is illustrated in greater detail below with reference to exemplary embodiments, in which.

DETAILED DESCRIPTION OF THE EXEMPLARY EMBODIMENTS

Figure 1:
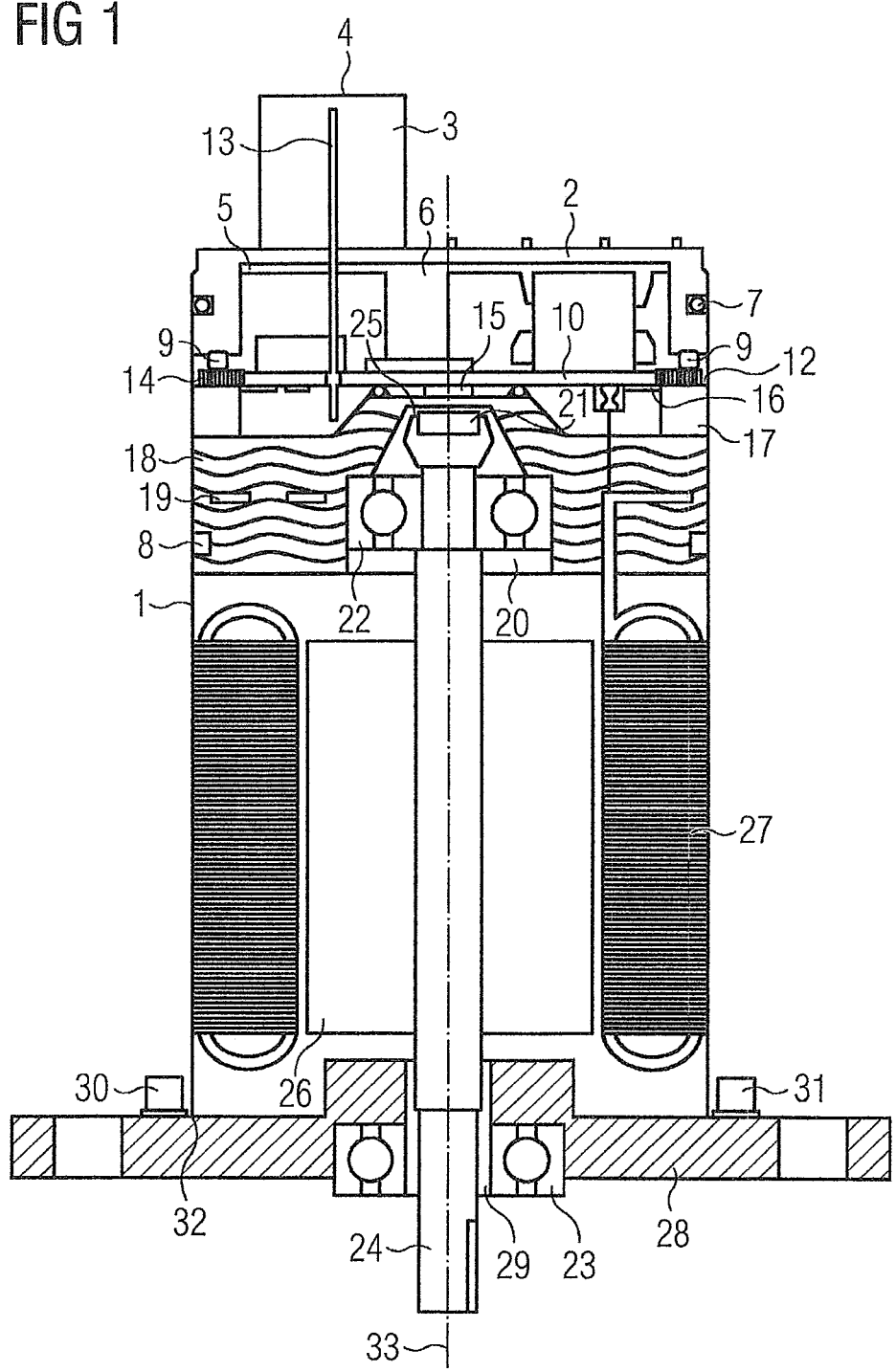
FIG. 1 is a cross-sectional view through the longitudinal axis of a housing in accordance with the invention and an electric machine.

FIG. 1 is a sectional representation of an exemplary embodiment of a housing in accordance with the invention and an electric machine.

The housing has a cylindrical configuration and comprises a housing jacket 1 and a housing lid 2 inserted form-lockingly into the housing jacket 1. The housing lid 2 has a plug member 3 with an oval base and a housing opening 4. In accordance with the invention, base areas other than oval shapes are conceivable for the plug member 3.

A first sealing ring 7 is arranged between the housing lid 2 and the housing jacket 1. A plug connector 13 is introduced into the housing via the housing opening 4 and connected with a cylindrical support plate 10. The circumferential surface of the support plate 10 adjoins an inner circumferential surface of the housing jacket 1 and is supplied with energy via the plug connector 13.

Two electrically insulating and vibration-damping elastic elements are provided, which are connected force-lockingly with the support plate 10, an inner part 5 and a press-on ring 9.

The free-form inner part 5 of silicone with a cylindrical contact element 6 is connected form-lockingly with the housing lid 2. The contact element 6 is oriented along a longitudinal axis 33 and presses on the support plate 10. In accordance with the invention, embodiments of the inner part 5 with more than one contact element 6 are also conceivable. Furthermore, the press-on ring 9 made of silicone is provided on the end face of the housing lid 2, where the ring presses onto the support plate 10 and generates a spring force on the support plate 10 due to its resilient characteristic. The press-on ring 9 further exhibits a sealing function. It takes the form of a one-piece ring. In accordance with the invention, however, embodiments with multipart press-on rings 9 are also conceivable.

The inner part 5 and the press-on ring 9 bring about vibration damping and thus mechanical decoupling of the support plate 10.

The support plate 10 comprises populating elements on its bottom and top faces, these elements generating heat loss. A first transistor 16, further transistors and a sensor 15 formed as a magnetic sensor known from the prior art are provided on the support plate 10. In an outer region of the support plate 10, a grid-type cooling device 14 is configured in the form of a peripheral circular ring that has electroplated blind holes, buried holes and metallized surfaces. These bring about advantageous heat transfer from the waste heat-generating populating elements to a heat-conducting ring 17. The configuration of the metallized blind holes additionally brings about electrical insulation of the cooling device 14 from the heat-conducting ring 17.

Defined contacting of the support plate 10 with the heat-conducting ring 17 is brought about via an insulation barrier 11 (shown in FIG. 2) and a shield connection 12.

In the region of the cooling device 14, the support plate 10 rests on the heat-conducting ring 17, made of aluminum, which is connected to the housing jacket 1. The contact element 6 and the press-on ring 9, which contacts the support plate 10 in the region of the cooling device 14, press the support plate 10 against the heat-conducting ring 17, so achieving particularly effective dissipation of heat from the populating elements of the support plate 10 via the cooling device 14 and the heat-conducting ring 17 into the housing and thence into a surrounding environment.

The support plate 10 is clamped between the press-on ring 9 and the heat-conducting ring 17. Below the support plate 10 and adjoining the heat-conducting ring 17 in a lower region, an electrically nonconductive cylindrical insulating body 18 is connected with the housing jacket 1. A circumferential surface of the insulating body 18 adjoins the inner circumferential surface of the housing jacket 1. A second sealing ring 8 is arranged between the insulating body 18 and the housing jacket 1.

An interconnection grid 19 is embedded in the insulating body 18, which interconnects poles of the electric machine formed as a 3-phase motor. The insulating body 18 has a recess 20 in a central region, in which recess a first bearing 22 formed as a ball bearing is arranged. A shaft 24 is mounted in the first bearing 22.

The shaft 24 is oriented along and around the longitudinal axis 33. A magnet 21 is arranged on an end face 25 of the shaft 24.

The sensor 15 is provided between the insulating body 18 and the support plate 10 and inside the heat-conducting ring 17. The sensor cooperates with the magnet 21 via a magnetic field passing through the insulating body 18 such that angles of rotation of the shaft 24 are measured.

With respect to the illustration in FIG. 1, a cylindrical rotor 26 of the electric machine is arranged below the insulating body 18 and around the shaft 24, and a cylindrical stator 27 is arranged around the rotor 26. With its outer circumferential surface, the stator 27 adjoins the inner circumferential surface of the housing jacket 1 and is electrically connected with the insulating body 18. The rotor 26 and the stator 27 are known from the prior art.

With respect to the illustration in FIG. 1, a flange plate 28 is arranged below the rotor 26 and the stator 27 and terminates the housing at the end face. The flange plate 28 is connected with the housing jacket 1 via a weld seam 32. Furthermore, the housing jacket 1 is screwed together with the housing jacket 1 in a flange-shaped region of the housing jacket 1 via a first screw connection 30, a second screw connection 31 and further screw connections. The first screw connection 30, the second screw connection 31 and the further screw connections extend parallel to the longitudinal axis 33.

Within a central region of the flange plate 28, a hole 29 is formed, in which the shaft 24 extends out of the housing. Furthermore, a second bearing 23, formed as a ball bearing and in which the shaft 24 is mounted, is connected with the flange plate 28. Heat dissipation to the surrounding environment is achieved via the flange plate 28.

Figure 2:
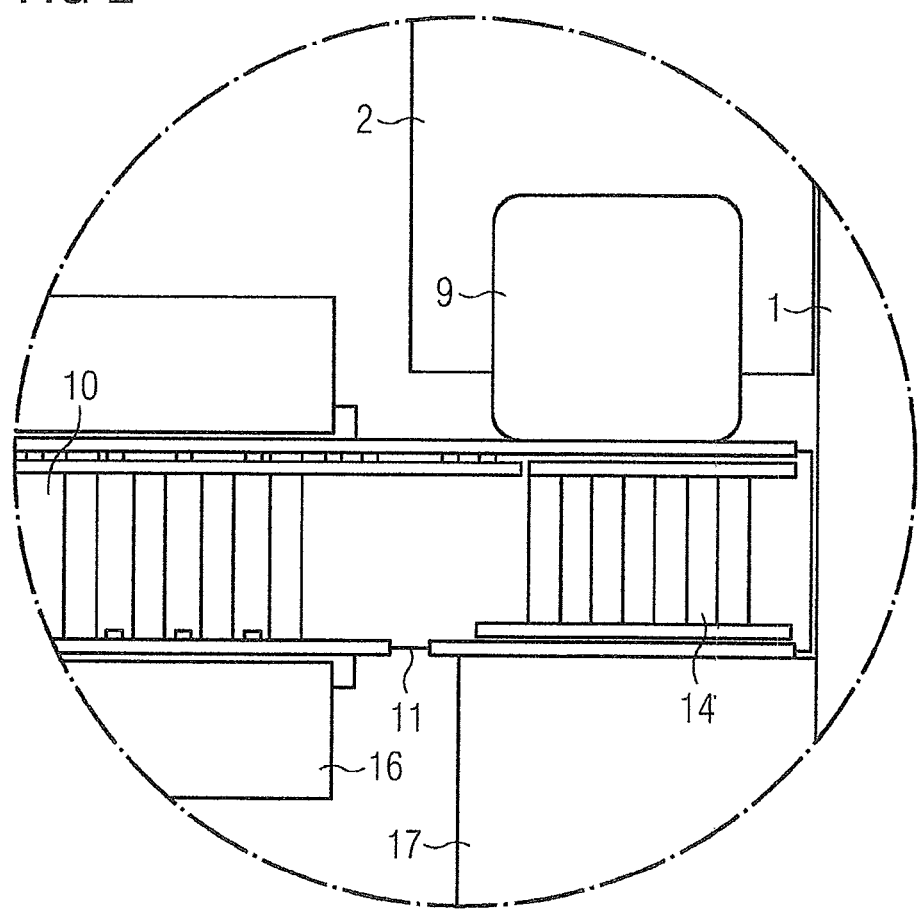
FIG. 2 is a schematic illustration of a portion of a housing in accordance with the invention with a portion of a support plate arranged therein.

FIG. 2 shows a portion of a housing in accordance with the invention with a portion of a support plate 10 arranged in the housing, where a first transistor 16 and further populating elements are arranged on the support plate. The structural principle corresponds to the embodiment shown in FIG. 1, and therefore the same reference signs are used as in FIG. 1.

The support plate 10 has a cylindrical construction and adjoins, with its circumferential surface, an inner circumferential surface of a cylindrical housing jacket 1. A cylindrical housing lid 2 which adjoins, with its circumferential surface, the inner circumferential surface of the housing jacket 1, is inserted into the housing jacket 1. A press-on ring 9 is arranged on the end face of the housing lid 2 and pressed onto the support plate 10 in the region of its top face. The support plate 10 rests, via its base, on a cylindrical heat-conducting ring 17, which is connected via its outer circumferential surface and the inner circumferential surface of the housing jacket 1 with the housing jacket 1.

As described with respect to FIG. 1, the support plate 10 has a circular ring-shaped cooling device 14 and an electrical insulation barrier 11. The press-on ring 9 and the heat-conducting ring 17 are in contact with the support plate 10 in the region of this cooling device 14 or clamp the support plate 10. This results in favorable heat dissipation from the populating elements of the support plate 10 via the support plate 10, the cooling device 14 and the heat-conducting ring 17 to the housing and thence into a surrounding environment.

The cooling device 14 has electroplated holes and metallized surfaces for this heat transfer. They are formed such that heat from one side (for example, a top) of the support plate 10 is conducted to an opposing side (for example, a bottom) of the support plate 10 without connecting the sides electrically.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A housing of an electric machine, the housing comprising:
    a heat-conducting ring arranged entirely within an interior of the housing;
    a support plate having components arranged on the support plate, the support plate being vibration damped and electrically insulated;
    a cooling device arranged entirely within the interior of the housing, on a periphery of the support plate and contacting the heat-conducting ring connected with the housing;
    a press-on ring arranged on a lid of the housing and on an end face of the lid; and
    an insulating body arranged adjoining the heat-conducting ring and disposed between the support plate and the electric machine;
    wherein an inner part is connected in a locked manner with the housing lid;
    wherein the inner part and the press-on ring comprise elastic elements and are connected in a further locked manner with the support plate; and
    wherein the support plate is clamped by the press-on ring and the heat-conducting ring.

2. The housing as claimed in claim 1, wherein the cooling device has an annular configuration.

3. The housing as claimed in claim 1, wherein the support plate is mounted on the heat-conducting ring.

4. The housing as claimed in claim 2, wherein the support plate is mounted on the heat-conducting ring.

5. The housing as claimed in claim 1, wherein at least one electrically insulating and vibration-damping elastic element is connected in a force-locking manner with the support plate.

6. The housing as claimed in claim 3, wherein the press-on ring arranged on the lid of the housing presses the support plate onto the heat-conducting ring.

7. The housing as claimed in claim 5, wherein the press-on ring arranged on the lid of the housing presses the support plate onto the heat-conducting ring.

8. The housing as claimed in claim 6, wherein the press-on ring is configured simultaneously as a spring and as a seal.

9. The housing as claimed in claim 1, further comprising:
    a sensor arranged on the support plate within the cooling device.

10. The housing as claimed in claim 9, wherein the sensor comprises a rotation sensor.

11. The housing as claimed in claim 1, wherein the insulating body comprises a bearing seat for a shaft.

12. The housing as claimed in claim 11, further comprising:
    a magnet arranged on an end face of the shaft and cooperating with the sensor via a magnetic field passing through the insulating body.

* * * * *